(12) United States Patent
Raber

(10) Patent No.: US 9,909,695 B2
(45) Date of Patent: Mar. 6, 2018

(54) JOINT LOCK RING SYSTEM FOR LINED PIPES

(71) Applicant: Imperial Pipe, Inc., Riverside, CA (US)

(72) Inventor: Robert P. Raber, Alta Loma, CA (US)

(73) Assignee: IMPERIAL PIPE, INC.

( * ) Notice: Subject to any disclaimer, the term of this patent is extended or adjusted under 35 U.S.C. 154(b) by 0 days.

(21) Appl. No.: 15/340,368

(22) Filed: Nov. 1, 2016

(65) Prior Publication Data

US 2017/0045162 A1    Feb. 16, 2017

Related U.S. Application Data

(63) Continuation of application No. 14/204,941, filed on Mar. 11, 2014, now Pat. No. 9,599,257.

(60) Provisional application No. 61/775,749, filed on Mar. 11, 2013.

(51) Int. Cl.
*F16L 13/02* (2006.01)

(52) U.S. Cl.
CPC ....... *F16L 13/0227* (2013.01); *F16L 13/0263* (2013.01)

(58) Field of Classification Search
CPC .............. F16L 13/0218; F16L 13/0227; F16L 13/0254; F16L 13/0263
USPC ......................................................... 285/55
See application file for complete search history.

(56) References Cited

U.S. PATENT DOCUMENTS

| | | |
|---|---|---|
| 2,188,925 A | 2/1940 | Bela |
| 2,372,712 A | 4/1945 | Crawford |
| 2,646,995 A | 7/1953 | Thompson |
| 3,142,499 A | 7/1964 | Lang |
| 3,195,931 A | 7/1965 | Braunagel |
| 3,217,922 A | 11/1965 | Glasgow |
| 3,235,291 A | 2/1966 | Lewis |
| 3,284,108 A | 11/1966 | West |
| 3,325,191 A | 6/1967 | Dick |
| 3,498,645 A * | 3/1970 | Danko ................ F16L 25/0027 285/230 |
| 3,508,766 A | 4/1970 | Kessler et al. |
| 3,890,483 A | 6/1975 | Webster |
| 3,965,555 A | 6/1976 | Webster et al. |
| 4,277,091 A | 7/1981 | Hunter |
| 4,400,019 A | 8/1983 | Fruck |
| 4,619,470 A | 10/1986 | Overath et al. |

(Continued)

OTHER PUBLICATIONS

International Search Report of PCT/US14/23652 dated Aug. 11, 2014. WO.

*Primary Examiner* — Brent W Herring
(74) *Attorney, Agent, or Firm* — The Belles Group, P.C.

(57) ABSTRACT

A joint ring system for lined pipes includes a first pipe and a second pipe joined end-to-end, each pipe having an interior lining covering substantially all of an interior wall of the respective pipe. A first ring is disposed within and substantially flush with the joined end of the first pipe, and a second ring is disposed within and substantially flush with the joined end of the second pipe. The first ring is configured to create a first circumferential pressure seal against the interior wall of the first pipe, and the second ring is configured to create a second circumferential pressure seal against the interior wall of the second pipe. At least one of the first ring and the second ring is configured to create a pipe joint pressure seal against the other ring.

20 Claims, 14 Drawing Sheets

(56) References Cited

U.S. PATENT DOCUMENTS

| | | | |
|---|---|---|---|
| 4,627,645 A | * | 12/1986 | Sauer ..................... F16L 17/04 |
| | | | 285/110 |
| 4,913,465 A | | 4/1990 | Abbema et al. |
| 5,009,737 A | | 4/1991 | Lescaut |
| 5,346,261 A | | 9/1994 | Abbema |
| 5,405,171 A | | 4/1995 | Allen et al. |
| 5,480,196 A | | 1/1996 | Adams |
| 5,547,228 A | | 8/1996 | Abbema et al. |
| 5,566,984 A | | 10/1996 | Abbema et al. |
| 5,566,986 A | | 10/1996 | Allen et al. |
| 5,584,512 A | | 12/1996 | Carstensen |
| 5,779,276 A | | 7/1998 | Allen |
| 5,863,078 A | | 1/1999 | Ball |
| 5,984,370 A | | 11/1999 | Lewis |
| 6,357,802 B1 | | 3/2002 | Nozato et al. |
| 6,719,186 B2 | | 4/2004 | Mudge, Jr. et al. |
| 6,863,313 B1 | | 3/2005 | Delange et al. |
| 7,431,341 B2 | | 10/2008 | McIntyre |
| 7,722,085 B2 | | 5/2010 | Pionetti |
| 8,596,692 B1 | | 12/2013 | Gourlay |
| 2004/0070199 A1 | | 4/2004 | Trivelli |
| 2005/0225089 A1 | | 10/2005 | Ben-Horin |
| 2006/0145479 A1 | | 7/2006 | McIntyre |
| 2011/0193339 A1 | | 8/2011 | Kenworthy |
| 2015/0260318 A1 | | 9/2015 | Goess-Saurau et al. |

\* cited by examiner

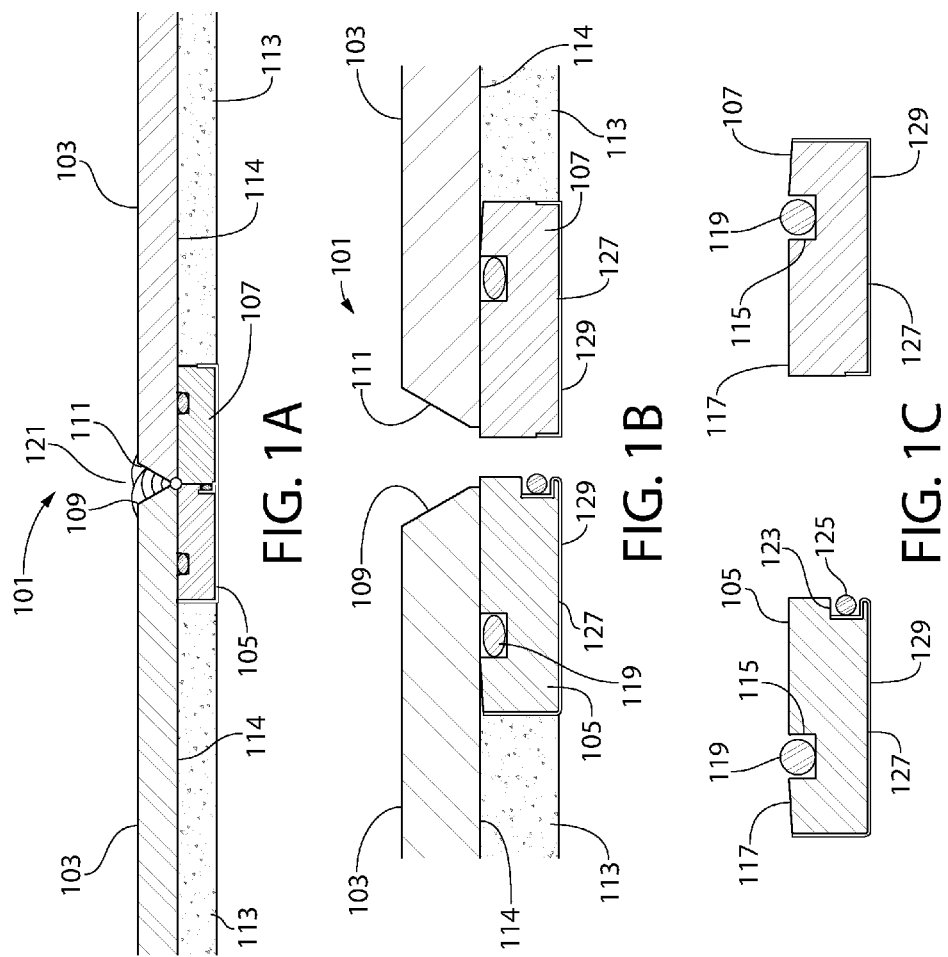

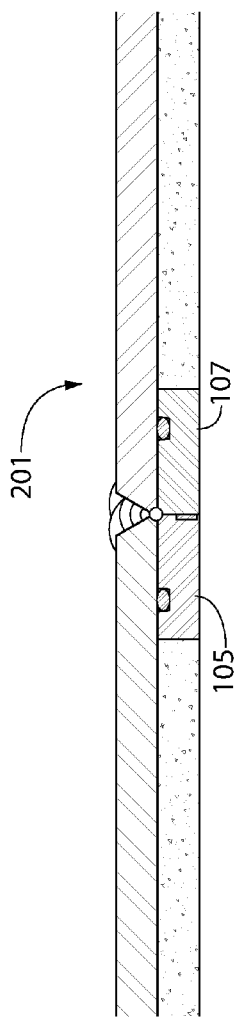
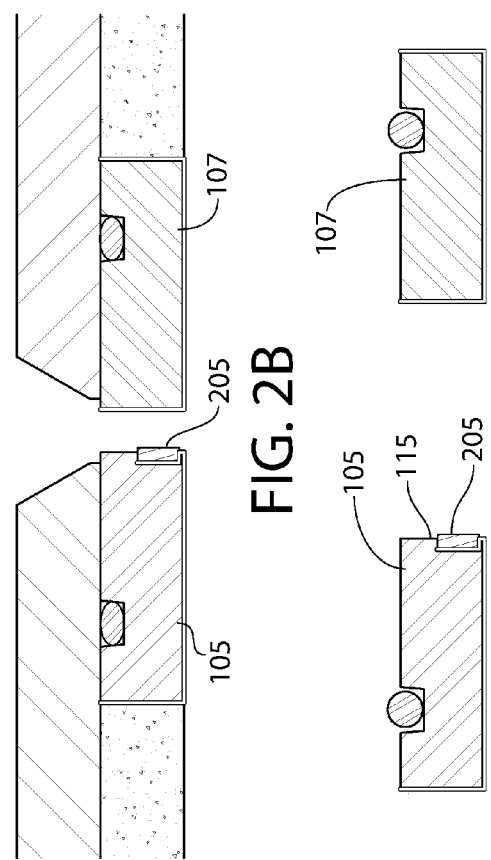

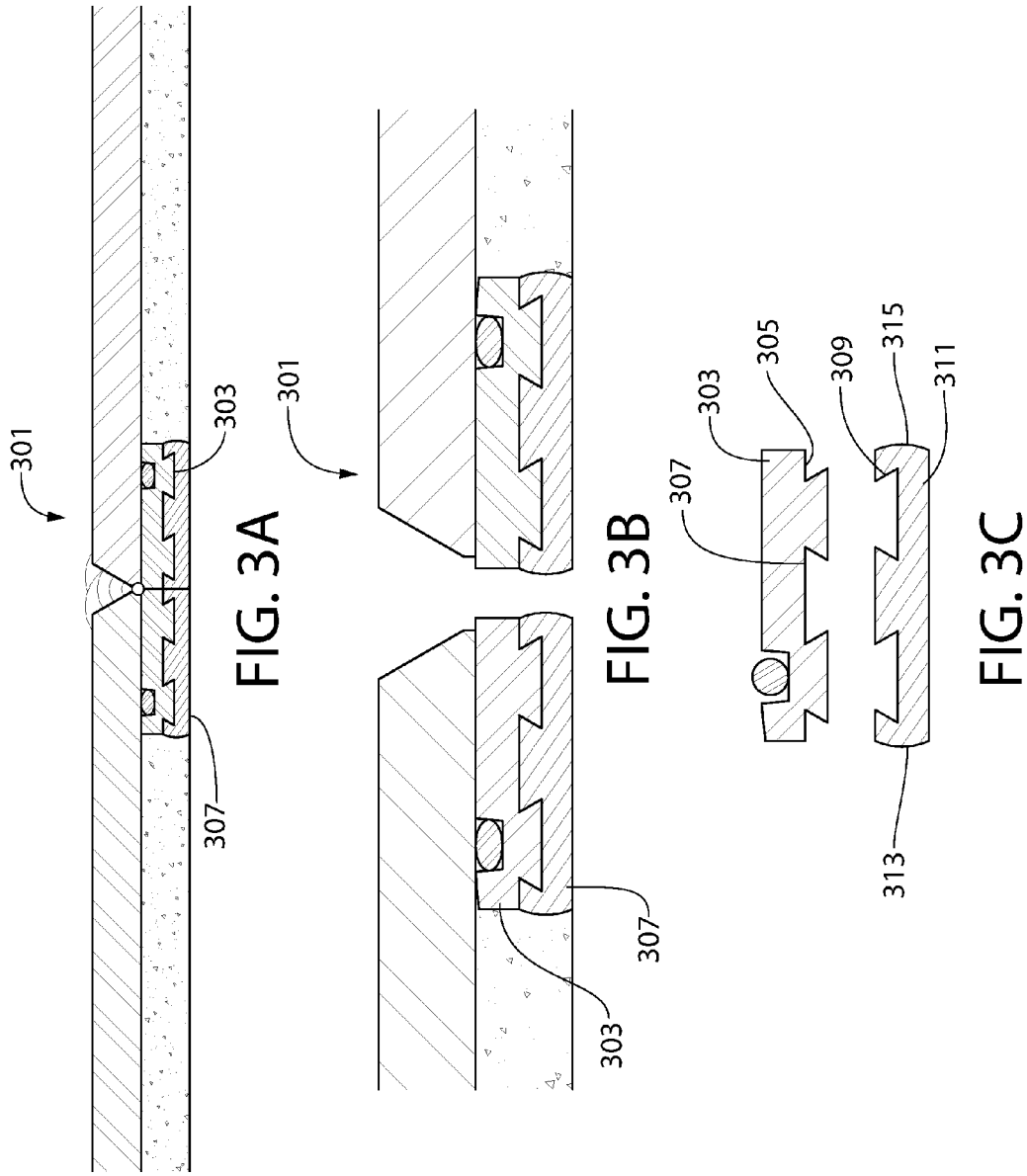

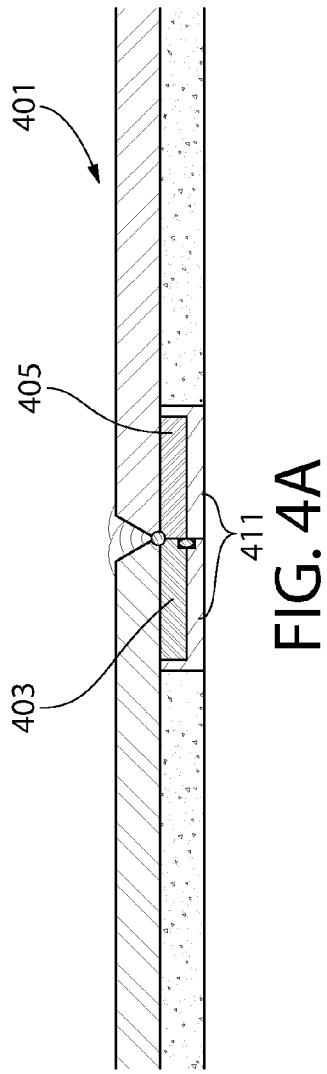
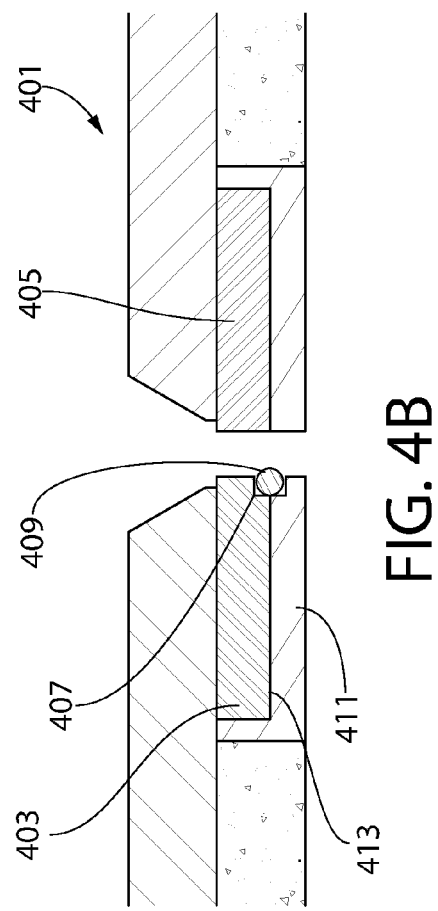

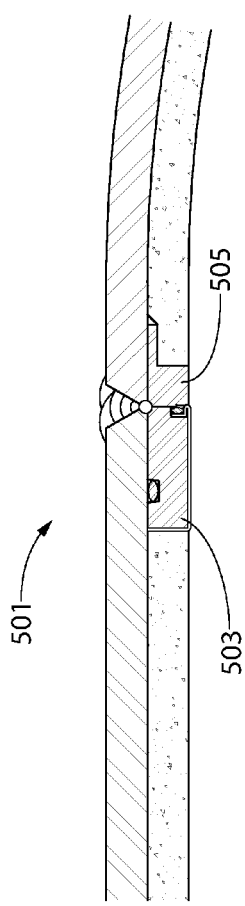
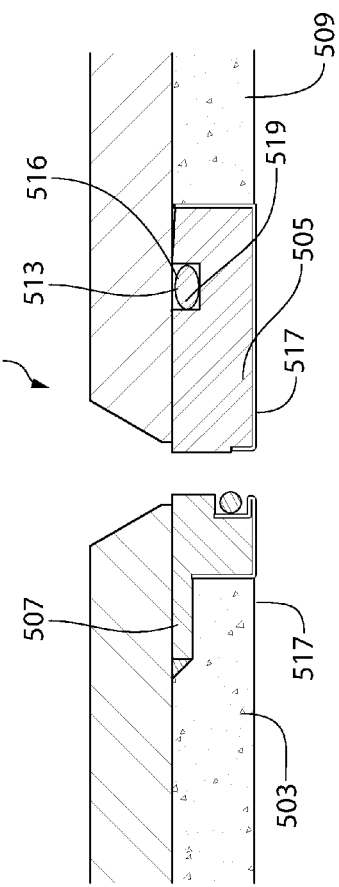
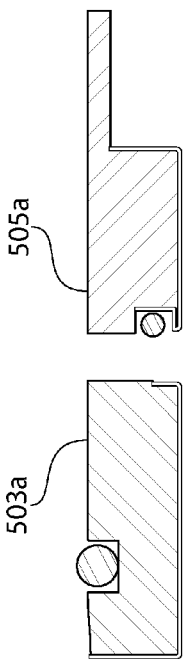
FIG. 5A
FIG. 5B
FIG. 5C

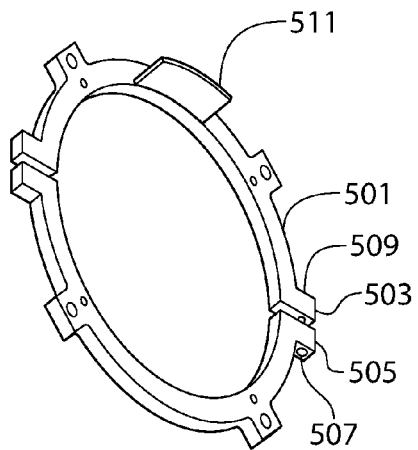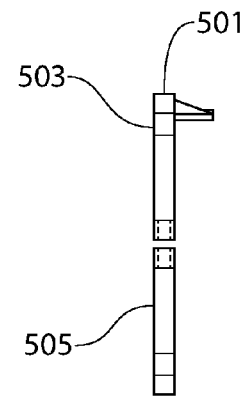
FIG. 7A    FIG. 7B
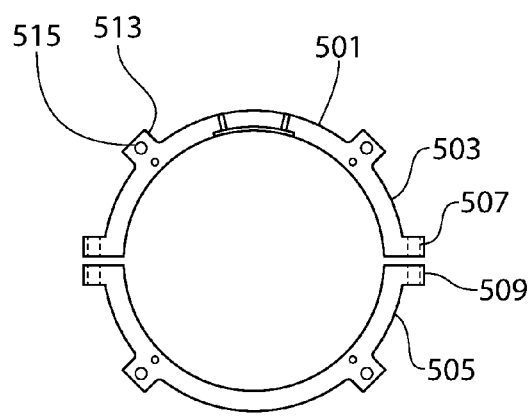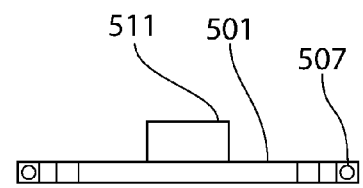
FIG. 7C    FIG. 7D

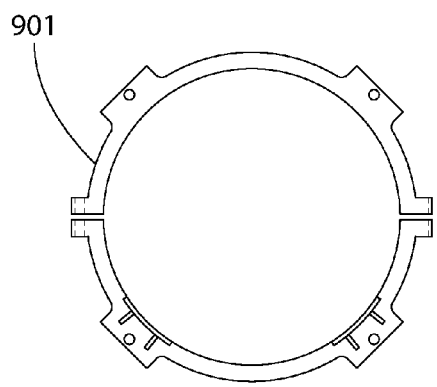
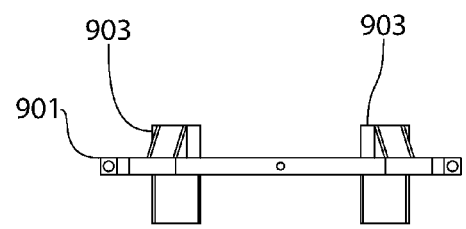
FIG. 9A    FIG. 9B
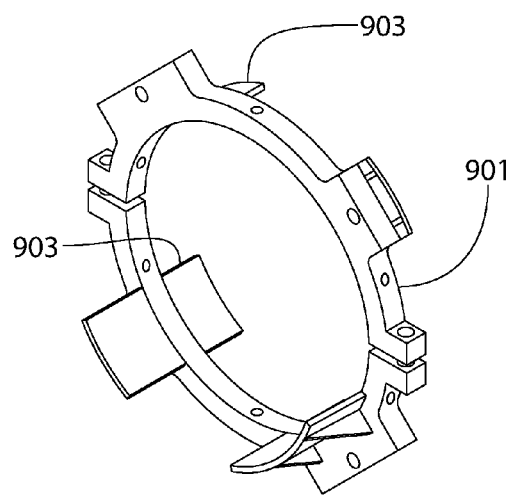
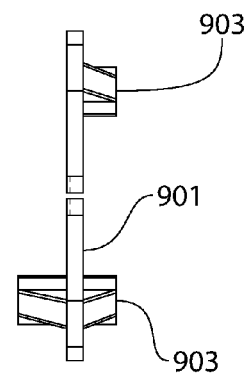
FIG. 9C    FIG. 9D

JOINT LOCK RING SYSTEM FOR LINED PIPES

CROSS-REFERENCE TO RELATED APPLICATIONS

Priority is claimed as a continuation application to U.S. patent application Ser. No. 14/204,941, filed Mar. 11, 2014, which claims priority to U.S. provisional application No. 61/775,749, filed Mar. 11, 2013, the disclosure of which is incorporated herein by reference in its entirety.

FIELD OF THE INVENTION

The field of the present invention is systems and methods for joining lined pipes, and particularly cement or rubber lined pipes.

BACKGROUND OF THE INVENTION

Within industries that use lined pipes, among which is the mining industry, steel pipe is manufactured and may be installed for multiple purposes. Steel pipe can be connected or joined in a variety of ways depending on the application and design requirements. One of the struggles that currently exists with pipes having internal cement or rubber linings is obtaining quality welds when connecting two pieces of beveled end steel cement-lined or rubber-lined pipe. Currently when two sections of pipe are joined together, beveled end against beveled end, and the initial weld pass (referred to as the "root pass") directly contacts the cement or rubber lining, resulting in both contamination of the welding and weakening of the cement or rubber during the root pass. The result is that the completed weld joint strength is reduced due to this contamination. Also this joint type does not allow a quality mechanical or nondestructive test of the completed welded joint.

In order to overcome this problem with concrete contamination, the thickness of the pipe wall has been increased by about 20% or greater than necessary for most applications. Such a solution results in about a 20% or greater increase in the cost of materials. A more cost effective solution to preventing concrete contamination when joining lined pipes by welding is therefore desired.

SUMMARY OF THE INVENTION

The present invention is directed toward a lined pipe and a system and method for joining such lined pipes. The pipes may be cement-lined or rubber-lined carbon steel pipes, although those of skill in the art may recognize uses for the system with other types of pipe and with other types of lining.

In a first separate aspect of the present invention, a ring is disposed within and substantially flush with the end of a pipe having an interior lining covering substantially all of the interior wall of the pipe. The ring may form a circumferential pressure seal against the interior wall of the pipe, and the radial thickness of the interior lining and the first ring are substantially the same.

In a second separate aspect of the present invention, the system includes two pipes joined end-to-end, each pipe having an interior lining covering substantially all of the interior wall of the respective pipe. One of two rings is disposed within the joined end of each pipe, with each ring being substantially flush with the respective joined end. At least one of the rings is configured to create a pipe joint pressure seal against the other of the rings.

Several different enhancements may be incorporated into this system, either alone or in combination with other enhancements. As one enhancement, the radial thickness of each ring may be approximately the same as the radial thickness of the lining of each respective pipe. As another enhancement, the inner circumferential surfaces of the rings may include a coating configured to resist corrosion when exposed to a fluid transported within the pipe during use.

In a third separate aspect of the present invention, a method of connecting lined pipes includes inserting one of two rings into the respective ends of two pipes to be joined end-to-end. Each ring is inserted so that it is substantially flush with the end of the respective pipe. With the rings inserted, the two pipe ends are welded together along an exterior circumference of the pipes. This method may be enhanced by use of a two piece clamp configured to seat the rings within the ends of the respective pipes as the two clamp pieces are drawn together.

In an fourth separate aspect of the present invention, any of the foregoing aspects may be employed in combination.

Accordingly, an improved joint lock ring system is disclosed. Advantages of the improvements will be apparent from the drawings and the description of the preferred embodiment.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures:

FIGS. 1A-E illustrate a first joint lock ring system;
FIGS. 2A-C illustrate a second joint lock ring system;
FIGS. 3A-C illustrate a third joint lock ring system;
FIGS. 4A-E illustrate a fourth joint lock ring system;
FIGS. 5A-D illustrate a fifth joint lock ring system;
FIGS. 7A-D illustrate a first half of a pipe clamp assembly;
FIGS. 9A-D illustrate an alternative embodiment of the first half of the pipe clamp assembly.

DETAILED DESCRIPTION OF THE INVENTION

Figure 1D:
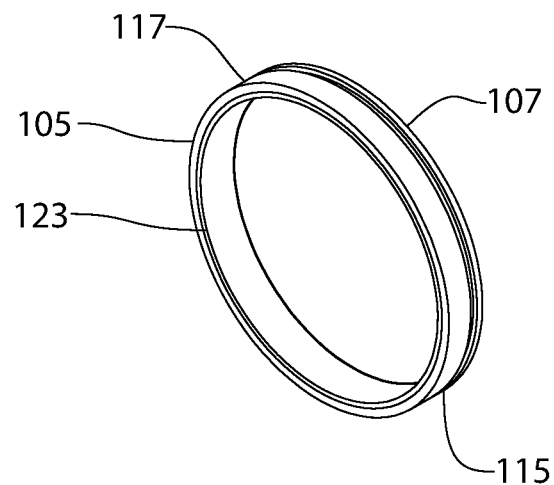
Figure 1E:
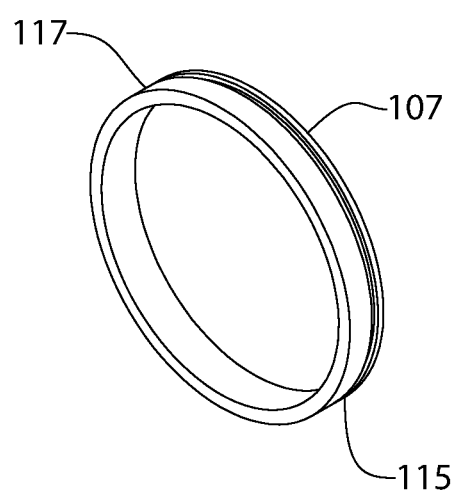
Figure 4C:
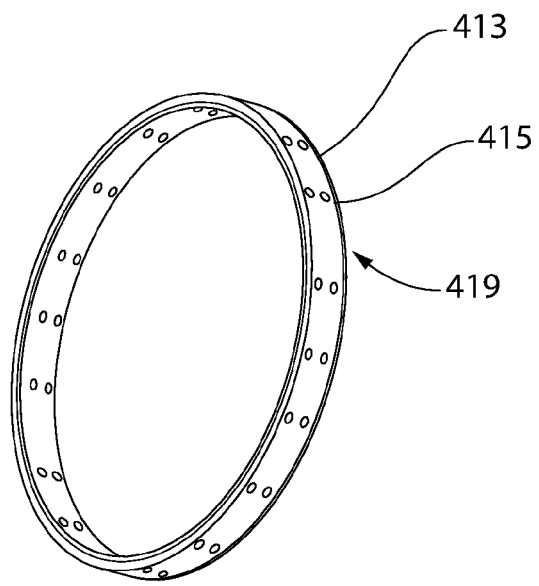
Figure 4D:
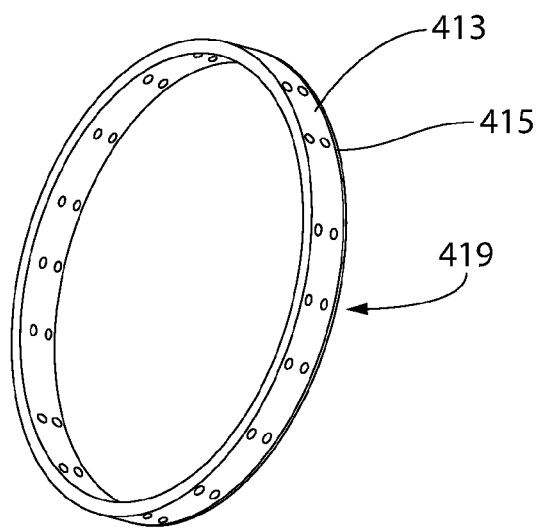
Figure 4E:
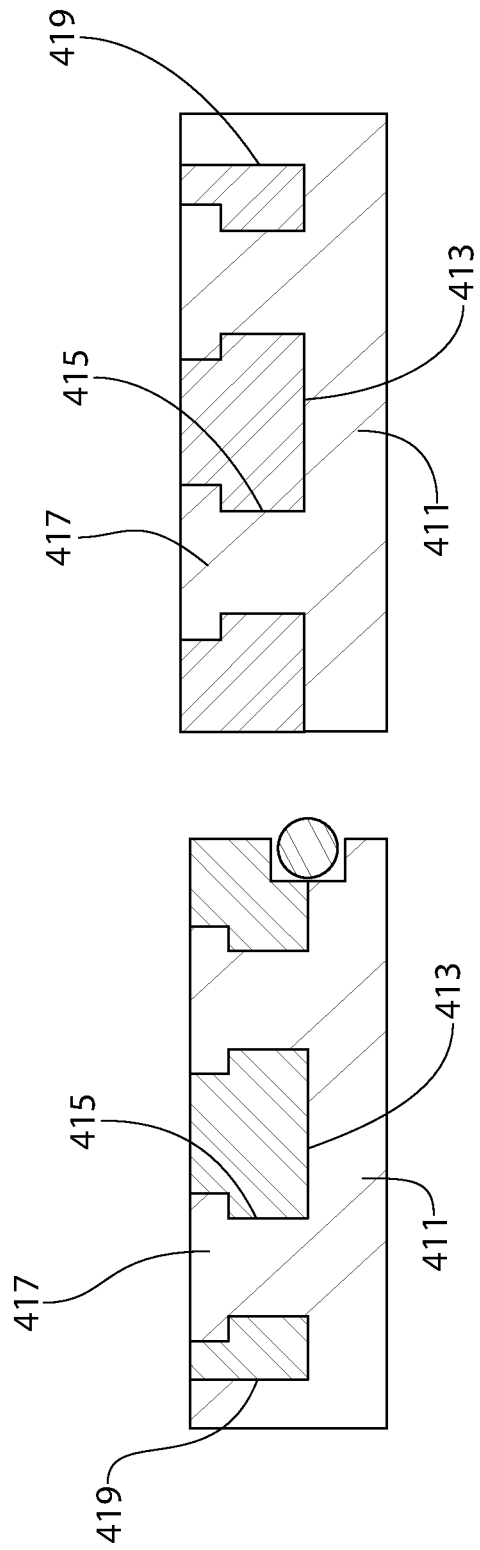

Turning in detail to the drawings, FIGS. 1A-E illustrate a joint lock ring system 101 suitable for use with a cement lined pipe 103. A cement lined pipe is described herein as an exemplified embodiment, and those of skill in the art will recognize that the same system may be used with any type of lined pipe, whether the lining be formed by cement, rubber, or any other materials. Thus, it is to be understood that The system includes two rings 105, 107, each inserted into the respective ends 109, 111 of the cement lined pipes 103, each ring being flush with the respective end of the pipe. The cement lining 113 lines the inner wall 114 of the pipes 103 between the rings 105, 107. Each ring 105, 107 is preferably formed from carbon steel, and preferably of the same steel grade and properties as the pipe, that is rolled to a specified diameter and machined to a specified tolerance. The diameter and tolerance are a matter of design choice, depending upon the size and wall thickness of the pipe into which the ring is to be placed.

Each ring 105, 107 includes a circumferential groove 115 in the outer circumferential surface 117, into which is placed an O-ring 119, which seals against the internal pipe wall 114. This first O-Ring 119 restricts fluid within the pipe from reaching or affecting the weld zone of the welded joint 121. The first ring 105 includes an anterior side circumferential groove 123 in which another O-ring 125 is seated. This second O-ring 125 creates a pipe joint pressure seal against the second ring 107, as shown in FIG. 1A, when the pipes 103 are aligned and welded together, and it likewise restricts fluid within the pipe from reaching or affecting the weld zone of the welded joint 121. The O-rings are preferably formed from a fluorocarbon elastomer rubber, such as the Viton® brand sold by E.I. du Pont de Nemours and Company of Wilmington, Del.

The anterior side O-ring locations are expected to hold line pressure in excess of 2000 PSI in the event of a weld failure. The benefit provided is a dual sealing system that prevents fluids from potentially escaping into the environment in the event of a weld failure.

Internal surfaces 127 of the rings 105, 107 that contact the fluid within the pipes are coated with a wear resistant, non-conductive ceramic coating 129. This coating 126 preferably extends entirely along the entire posterior surface 131 of the rings 105, 107 and partially along the anterior surface 133, at least to approximately where the O-ring 119 contacts the anterior surfaces 133 of each ring 105, 107 to form the pipe joint pressure seal. Preferably, an aluminum oxide, Al2O3 (such as is available from Accuratus Corporation of Phillipsburg, N.J.), coating is applied by a plasma spray process to a thickness of about 15 mils to 20 mils. Such a coating is highly resistant to abrasion, heat, and corrosion.

A second joint lock ring system 201 is illustrated in FIGS. 2A-C. This second system 201 is like the first, except for instead of an O-ring being placed in the side circumferential groove 115 of the first ring 105, a flat, flexible gasket 205 is placed therein. This flat flexible gasket is preferably of the type obtainable from Garlock Sealing Technologies of Palmyra, N.Y., particularly the Garlock BLUE-GARD 3400 model of flexible gasket.

A third joint lock ring system 301 is illustrated in FIGS. 3A-C. This third system 301 is also like the first, except for this system 301 does not include a protective ceramic coating, and instead of an O-ring being placed in the side circumferential groove of a ring, the inner surface 305 of each ring 303 is formed with one or more interlocking grooves 307. These interlocking grooves 307 are formed to be complementary to similar interlocking grooves 309 formed on a protective circumferential liner 311, which is preferably molded with Viton® fluorocarbon elastomer rubber. The interlocking grooves 307 of each ring 303 and the interlocking grooves 309 of each liner 311 may take a shape according to design preference, with the purpose being that the respective grooves 307, 309 serve to hold the liner in place on the inner surface 305 of the ring 303. The anterior and posterior edges 313, 315 of each liner 311 extends slightly beyond the edge of the ring 303 so that a seal can be created with the cement liner on one edge 313 and with the second ring on the other edge 315. These sealing points prevent fluids from potentially escaping into the environment in the event of a weld failure.

A fourth joint lock ring system 401 is illustrated in FIGS. 4A-E. This fourth system 401 incorporates features of both the first system and the second system. In this fourth system 401, the first ring 403 includes an anterior side circumferential groove 407 in which an O-ring 409 is seated, and a liner 411, which is again preferably molded with Viton® fluorocarbon elastomer rubber, is affixed the inner surface 413 of each ring 403, 405. Through holes 415 are formed around each ring 403, 405, the liner 411 extends into the through holes. The through holes 415 are formed to have varying diameters, and the liner 411 is formed with fingers 417 having a complementary shape as compared to the through holes 415 to aid in holding the liner 411 in place on each ring 403, 405. The liner 411 covers the entire posterior edge 419 of each ring 403, 405 so that a bonded seal can be created with the cement or rubber liner adjacent the posterior edge 419. This sealing point prevents fluids from potentially escaping into the environment in the event of a weld failure.

Figure 5D:
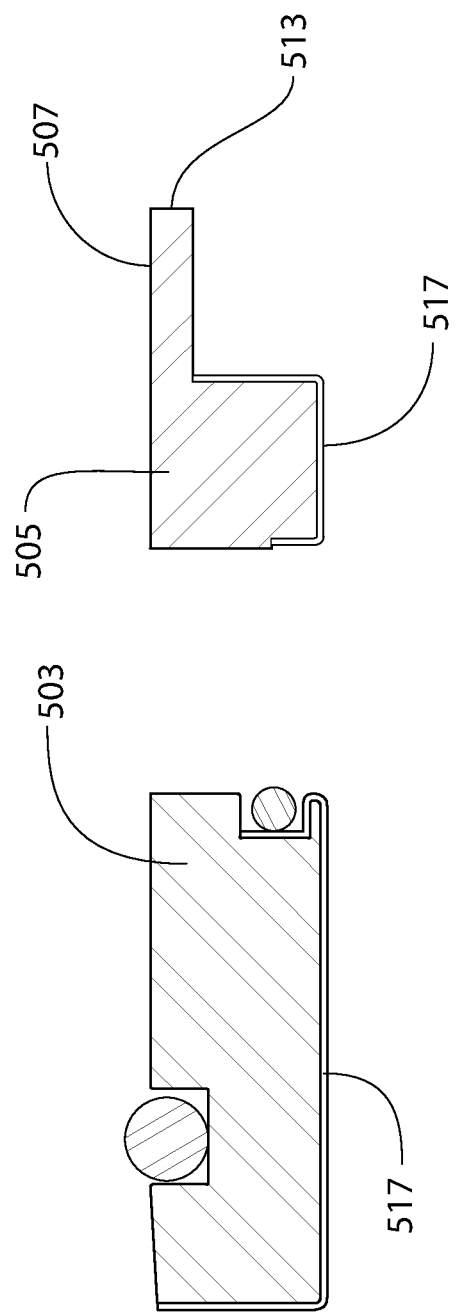

A fifth joint lock ring system 501 is illustrated in FIGS. 5A-D. In this fifth system 501, the first ring 503 may be similar to any of the rings described above in FIGS. 1A and 2A. The second ring 505 includes a circumferential flange 507 that extends between the cement lining 509 and the pipe 511. The end 513 of the flange 507 is affixed to the inner pipe wall 515 by a weld 516, before the lining is placed, to form a pressure seal and to hold the ring 505 in place. Both rings 503, 505 include a ceramic coating 517. The O-ring 519 that is used to create the pipe joint pressure seal may be located on either ring, as it is shown in FIG. 5C as bing on the first ring 503, and it is shown in FIG. 5D as being on the second ring 505a. This type of ring with a flange is particularly useful for curved pipe, tees, ells, reducers, and other nonlinear pipe sections.

Figure 6A:
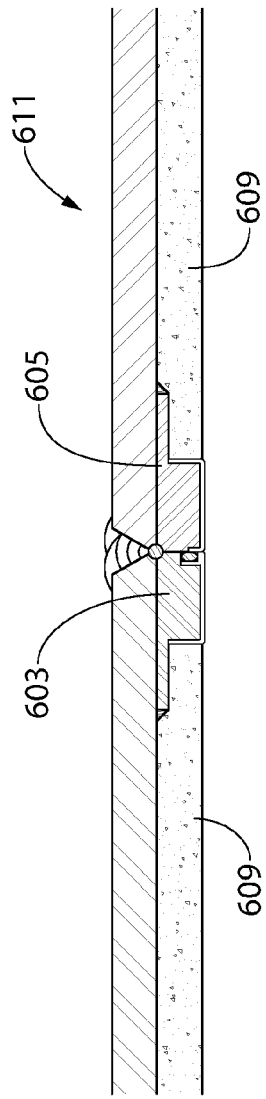
FIGS. 6A-C illustrate a sixth joint lock ring system.
Figure 6B:
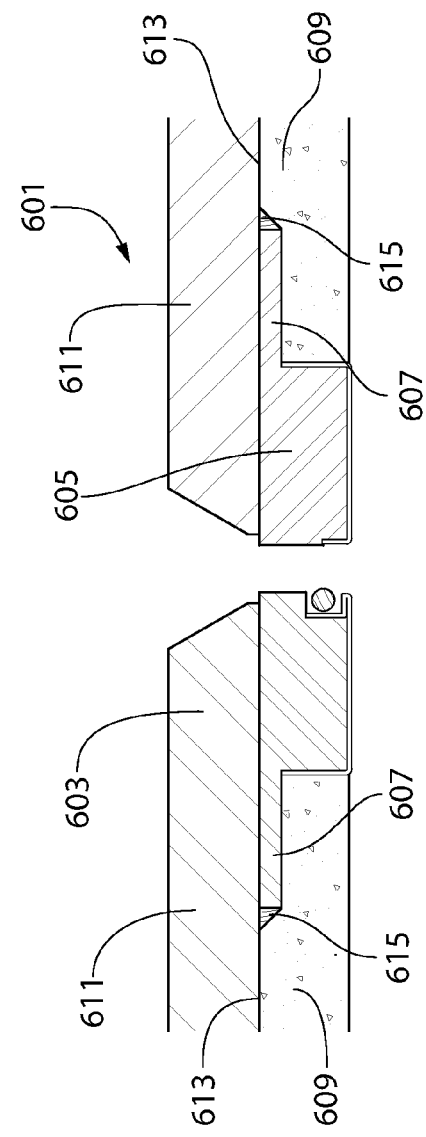
Figure 6C:
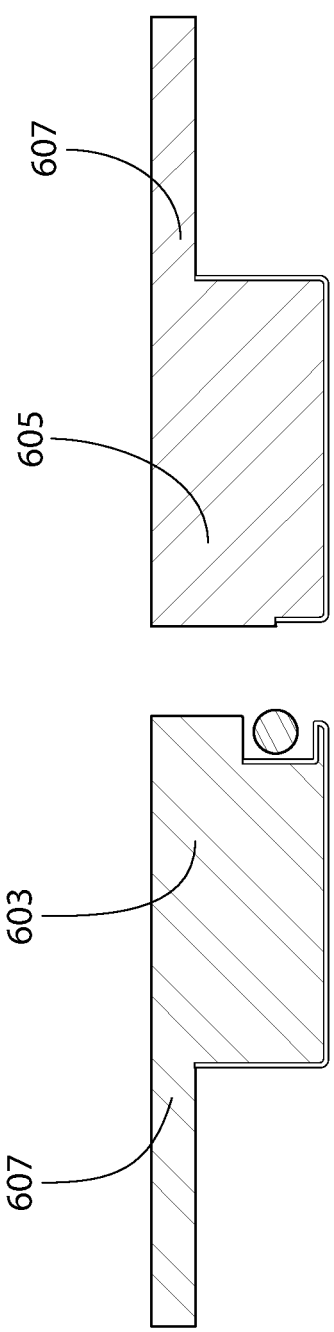
Figure 8A:
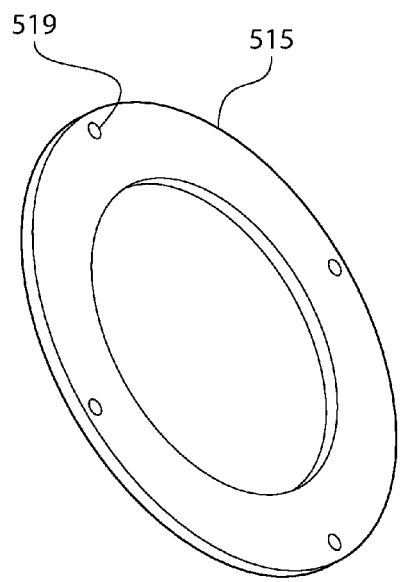
FIGS. 8A-C illustrate a second half of a pipe clamp assembly.
Figure 8B:
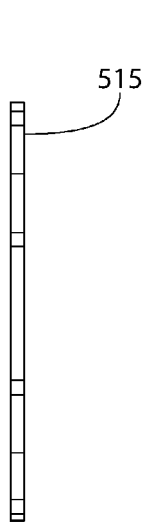
Figure 8C:
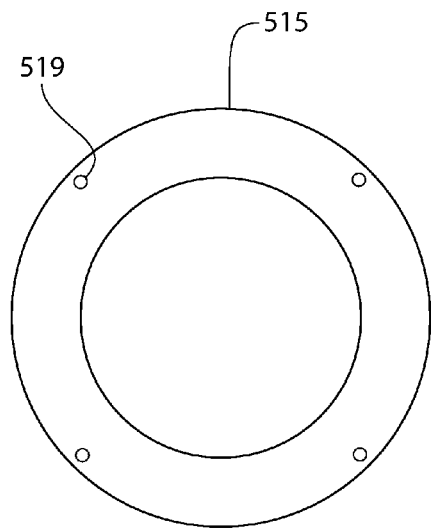

A sixth joint lock ring system 601 is illustrated in FIGS. 6A-C. In this sixth system 601, both rings 603, 605 are similar to the second ring depicted in FIGS. 5A-C. Both rings include a circumferential flange 607 which extends between the cement lining 609 and the interior walls 613 of the pipes 611, each circumferential flange 607 being affixed to the interior wall 613 of the respective pipe 611 by a weld 615, which forms a pressure seal to prevent leakage in the event the weld between the two pipes fails. This type of system is particularly useful for retrofitting lined pipes in the field.

During the manufacture process, the rings are manufactured to meet the intended use conditions for the pipe, and the internal lining requirements for the intended use are determined. The rings are first installed into each end of the pipe at the manufacturing plant, after which the pipe then goes through a machine powered centrifugal cement lining process, such as is well known in the cement-lined pipe industry.

At the manufacturing plant customer specified lengths of steel pipe have their internal ends ground with a 0.040 chamfer and any excess internal weld seam is sanded smooth. Rings according to a customer's specification are fitted with O-rings in the grooves on the outer circumferential surfaces of each ring. A non-toxic, non-petroleum base lubrication is applied to the inside end of the pipe. The ring is then pressed into position. Once the ring is in place, four one inch long tack welds are applied to the back side of the ring. This procedure is repeated for each end of the pipe. The pipe is then loaded into the cement lining machine, in which cement slurry is pumped into the pipe from one end to the other. The pipe is rolled into the machine and spun at an appropriate rate to centrifugally compact the lining to the predetermined thickness and quality. Since the inserted ring was machined to match the required thickness of the applied cement lining, and overall smooth interior surface of the pipe is formed by compressing the cement lining against the end of each ring, creating a seal and bond to the pipe and the inserted ring. The pipe is removed from the machine, hand finished and capped to go through the curing process. After the cement is cured and reaches its designed strength the pipe section is ready for shipping to the customer for installation.

Although the embodiments above are presented from the perspective of the ring systems being placed at the time of manufacture, it is possible, albeit somewhat labor intensive, to place the rings in the field when a pipe needs to be cut to a shorter length. In the field, after the pipe is cut to length, the next step is remove sufficient amount of the cement lining to allow the ring to be placed into the cut end of the pipe. Removal of at least 1-2 cm extra of the lining is preferred. With the cement lining partially removed, and the cut end of the pipe otherwise prepared to receive the ring by removal of burrs and sharp edges, the two-piece clamp shown in FIGS. 7A-D and 8A-C are used to position the ring within the end of the cut pipe. The first clamp part 701 shown in FIGS. 7A-D includes two halves 703, 705, which are affixed to the end of the cut pipe using holes 707 in flanges 709 to clamp the two halves 703, 705 around the outer wall of the cut pipe end. The first flange part 701 also includes at least 4 other clamp flanges 713, with holes 715, which are used to secure the first clamp part 701 to the second clamp part 717. Preferably, the first clamp part 701 is positioned to have one edge approximately flush with the cut end of the pipe, with the guide flanges 711 extending away from the cut end of the pipe to support ring being inserted into the pipe. In alternative embodiments more guide flanges may be included, or they may be excluded altogether. With the first clamp part 701 affixed to the cut end of the pipe, the ring is partially seated within the cut end as far as it can be inserted by hand, which will typically be at the point where the O-ring is pressed up against the cut end of the pipe. With the ring partially seated, the second clamp part 717 is secured to the first clamp part by aligning the four peripheral holes 719 on the second clamp part 717 with the four holes 715 on the first clamp part 701 and inserting bolts through the holes 715 in the first clamp part 701 to engage the peripheral holes 719 (which may be threaded, or a nut may be used) of the second clamp part 717. The second clamp part 717 is then drawn toward the first clamp part 701 by tightening the bolts, and the second clamp part 717 will subsequently press the ring in to the cut end of the pipe by compressing the O-ring. Once the ring is fully seated, approximately flush with the cut end of the pipe, the O-ring will create the desired seal, as described above. As a last step, prior to welding the cut pipe to another pipe, is to fill in the space left between the edge of the cement lining and the now-seated ring with appropriate cement for the intended use of the pipe.

FIGS. 9A-D illustrate an alternative embodiment of the first clamp part 901. This clamp part is similar to the first clamp part shown in FIGS. 7A-D, with the addition of stabilizing flanges 903 which are placed extending along the exterior surface of the pipe. These stabilizing flanges 903 aid in placement of the first clamp part on the pipe, helping to ensure that the bolts of the first clamp part are aligned with the longitudinal axis of the pipe.

Two sections of pipe are joined by placing them end to end in preparation for welding. An for rings with a side circumferential groove, and O-ring or flexible gasket is placed into the side circumferential groove, and two of the first clamp parts, shown in FIGS. 5A-D, are used to draw the two sections of pipe together and compress the O-ring or gasket between the ring surfaces. The joint may then be tack welded in preparation for the complete welding of the two pipe sections. Each pipe joint is connected in the same manner. The weld joints formed in this manner may undergo nondestructive weld testing and the final quality control examination, without concern of cement inclusion or further weakening the cement lining.

Some of the benefits that may be realized from the joint lock ring systems described above include:

Allows for full penetration joint welding with no internal cement or rubber lining contamination in the weld zone.

Allows for mechanical and non destructive testing of the finished weld joint.

Allows for a reduction in pipe wall thickness and weld time over partial joint penetration designs.

Replaces a challenged industry standard for cement lined pipe joining.

Accomplishes a permanent inside pipe shoulder for cement lining containment and protection that is out of the weld zone, and no cement patching is required before or after the joint welding for factory installed rings.

The rings can be factory installed in all straight pipe and loose fittings to be butt welded in the field.

The rings can be easily installed in the field after cutting and beveling the pipe.

Shop quality internal cement lining patches can be accomplished by installation crews for all "cut to fit" field joint applications.

Some designs of the ring system utilize an O-ring gasket that provides a secondary pressure seal that will safe guard the environment in the event of a weld failure.

The rings can be used with all designs of cement and rubber linings.

The ring base material, ID coatings, and O-ring seal can be engineered and adapted to meet specific pipe grades, various service conditions, and fluid types.

Thus, a joint lock ring system is disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A joint ring system for lined pipes, the system comprising:
    a first pipe and a second pipe, each pipe having an interior lining covering substantially all of an interior wall of the respective pipe, the pipes being joined end-to-end;
    a first ring disposed within and substantially flush with the joined end of the first pipe, with the first ring located between a proximal end of the interior lining within the first pipe and the joined end of the first pipe; and
    a second ring disposed within and substantially flush with the joined end of the second pipe, with the second ring located between a proximal end of the interior lining within the second pipe and the joined end of the second pipe, wherein at least one of the first ring and the second ring is configured to create a pipe joint pressure seal against the other of the first ring and the second ring; and
    wherein each ring comprises:
        a plurality of through holes positioned circumferentially around the respective ring; and
        a liner disposed on an inner circumferential surface of the respective ring, the liner extending into each of the plurality of through holes.

2. The joint ring system of claim 1, wherein the interior lining of each pipe comprises one of cement or rubber.

3. The joint ring system of claim 1, wherein the pipe joint pressure seal comprises an O-ring seated in a groove formed in an anterior circumferential surface of one of the rings.

4. The joint ring system of claim 1, further comprising a coating disposed on an inner circumferential surface of each ring, wherein the coating is configured to resist corrosion when exposed to a fluid transported within each pipe during use.

5. The joint ring system of claim 1, wherein each through hole has a first hole diameter near an outer circumferential surface of each respective ring and a second hole diameter near the inner circumferential surface of each respective ring, the first hold diameter being larger than the second hole diameter, and wherein each liner comprises a plurality of fingers, each finger extending into one of the through holes, each finger having a first finger diameter and a second finger diameter, the first finger diameter being approximately equal to the first hole diameter, and the second finger diameter being approximately equal to the second hole diameter.

6. The joint ring system of claim 1, wherein each liner entirely covers a posterior edge of each respective ring.

7. A joint ring system for lined pipes, the system comprising:
a first pipe and a second pipe, each pipe having an interior lining covering substantially all of an interior wall of the respective pipe, the pipes being joined end-to-end;
a first ring disposed within and substantially flush with the joined end of the first pipe, the first ring located between a proximal end of the interior lining within the first pipe and the joined end of the first pipe;
a second ring disposed within and substantially flush with the joined end of the second pipe, the second ring located between a proximal end of the interior lining within the second pipe and the joined end of the second pipe; and
a sealing element configured to form a pipe joint pressure seal between the first ring and the second ring; and
wherein each ring comprises:
a plurality of through holes positioned circumferentially around the respective ring; and
a liner disposed on an inner circumferential surface of the respective ring, the liner extending into each of the plurality of through holes.

8. The joint ring system of claim 7, wherein the interior lining of each pipe comprises one of cement or rubber.

9. The joint ring system of claim 7, wherein the third sealing element comprises at least one anterior circumferential seal, each anterior circumferential seal disposed on at least one of the rings and configured to seal against the other ring.

10. The joint ring system of claim 9, wherein each anterior circumferential seal seats in a groove formed in the anterior circumferential surface of each respective ring.

11. The joint ring system of claim 7, further comprising a coating disposed on an inner circumferential surface of each ring, wherein the coating is configured to resist corrosion when exposed to a fluid transported within the joined pipes during use.

12. The joint ring system of claim 7, wherein each through hole has a first hole diameter near an outer circumferential surface of each respective ring and a second hole diameter near the inner circumferential surface of each respective ring, the first hold diameter being larger than the second hole diameter, and wherein each liner comprises a plurality of fingers, each finger extending into one of the through holes, each finger having a first finger diameter and a second finger diameter, the first finger diameter being approximately equal to the first hole diameter, and the second finger diameter being approximately equal to the second hole diameter.

13. The joint ring system of claim 7, wherein each liner entirely covers a posterior edge of each respective ring.

14. A joint ring system for lined pipes, the system comprising:
a first pipe and a second pipe, each pipe having an interior lining covering substantially all of an interior wall of the respective pipe, the pipes being joined end-to-end;
a first ring disposed within the joined end of the first pipe, the first ring including a first side, a second side opposite the first side, and a third side, wherein the first side of the first ring is substantially flush with the joined end of the first pipe, the second side of the first ring abuts against the interior lining of the first pipe, such that the first ring is located between a proximal end of the interior lining within the first pipe and the joined end of the first pipe, and the third side of the first ring is configured to form a first circumferential pressure seal against the interior wall of the first pipe; and
a second ring disposed within the joined end of the second pipe, the second ring including a first side, a second side opposite the first side, and a third side, wherein the first side of the second ring is substantially flush with the joined end of the second pipe, the second side of the second ring abuts against the interior lining of the second pipe, such that the second ring is located between a proximal end of the interior lining within the second pipe and the joined end of the second pipe, the third side of the second ring is configured to form a second circumferential pressure seal against the interior wall of the second pipe, and at least one of the first ring and the second ring is configured to create a pipe joint pressure seal against the other of the first ring and the second ring; and
wherein each ring comprises:
a plurality of through holes positioned circumferentially around the respective ring; and
a liner disposed on an inner circumferential surface of the respective ring, the liner extending into each of the plurality of through holes.

15. The joint ring system of claim 14, wherein the interior lining of each pipe comprises one of cement or rubber.

16. The joint ring system of claim 14, wherein at least one of the circumferential pressure seals comprises a weld.

17. The joint ring system of claim 14, wherein the pipe joint pressure seal comprises an O-ring seated in a groove formed in an anterior circumferential surface of one of the rings.

18. The joint ring system of claim 14, further comprising a coating disposed on an inner circumferential surface of each ring, wherein the coating is configured to resist corrosion when exposed to a fluid transported within each pipe during use.

19. The joint ring system of claim 14, wherein each through hole has a first hole diameter near an outer circumferential surface of each respective ring and a second hole diameter near the inner circumferential surface of each respective ring, the first hold diameter being larger than the second hole diameter, and wherein each liner comprises a plurality of fingers, each finger extending into one of the through holes, each finger having a first finger diameter and a second finger diameter, the first finger diameter being approximately equal to the first hole diameter, and the second finger diameter being approximately equal to the second hole diameter.

20. The joint ring system of claim 14, wherein each liner entirely covers a posterior edge of each respective ring.

\* \* \* \* \*